Dec. 3, 1968 C. T. DAVEY ET AL 3,414,822
REPETITIVE PULSE SIGNAL GENERATOR WITH GATED LOAD SWITCHING CONTROL
Filed Jan. 10, 1966
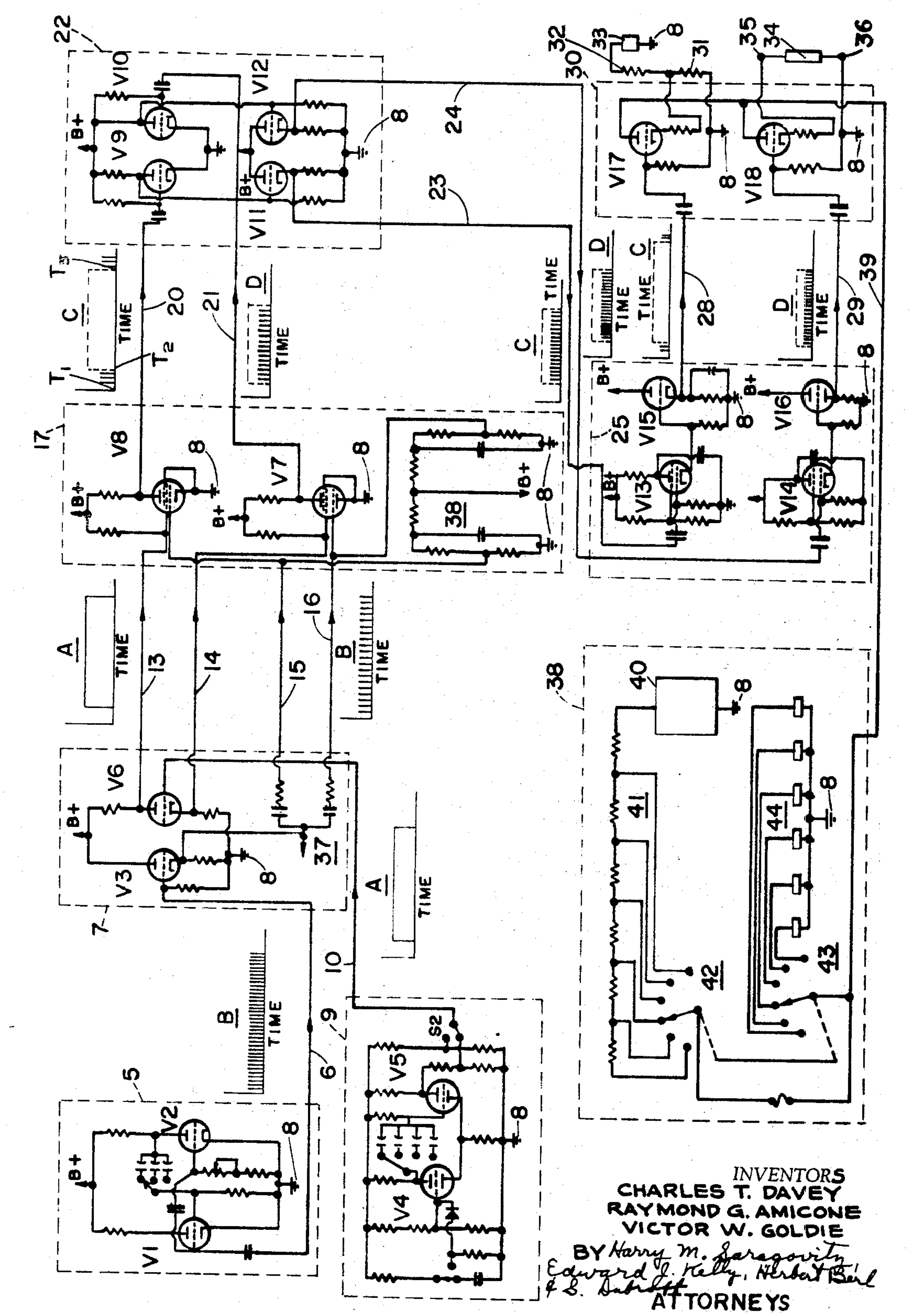
INVENTORS
CHARLES T. DAVEY
RAYMOND G. AMICONE
VICTOR W. GOLDIE
BY Harry M. Saragovitz
Edward J. Kelly, Herbert Berl
& S. Dubroff
ATTORNEYS 3,414,822

REPETITIVE PULSE SIGNAL GENERATOR WITH GATED LOAD SWITCHING CONTROL

Charles T. Davey, Dresher, Raymond G. Amicone, Springfield, and Victor W. Goldie, Philadelphia, Pa., assignors to the United States of America as represented by the Secretary of the Army Filed Jan. 10, 1966, Ser. No. 519,786
5 Claims. (Cl. 328—60)

ABSTRACT OF THE DISCLOSURE

A pulse generator or pulser provides a continuous train of pulses which are fed through a phase splitter to each of two gating amplifiers only one of which conducts at a time. Through one amplifier pulsed-energy is fed to a dummy load circuit electrically matched to the device under test. A pulse application gate is excited to cause a rectangular pulse to be applied to the phase splitter to drive the normally-conducting gate off and the other gate on for a predetermined time with the result that the pulse energy is shifted from the dummy load circuit to the device under test. The pulsed energy is switched from the dummy load circuit to the device under test during the charge interval or pulse-off time of the pulser so that the change in load has no effect on the pulse amplitude supplied to the device under test.

The present invention relates to pulse signal generators, and more particularly to repetitive-pulse signal generators or pulsers of the type used to modulate transmitters such as radar systems using magnetrons, with relatively high power requirements.

It is often desirable to provide rapid switching of pulsed power in such a way that the magnitude of the power delivered can be accurately controlled. The problems associated with performing this function are many. Foremost among these is the ability of the power source to maintain a constant value of power that is independent of the load. Repetitive pulsers of this type used to modulate microwave transmitters normally use an artificial delay line or pulse forming network to store energy between pulses that is subsequently released into the transmitter when the pulsed microwave power is desired.

If such a network is allowed to charge for sometime and then be discharged, extracting a train of pulses from the modulator, the result is that a successively decreasing pulse amplitude may be delivered to the load. Various types of compensation circuits have been used in the past to bring about rapid charging of the pulse forming network and thus to obtain better regulation in the pulse amplitude from the pulser, and greater efficiency from the system. These methods, while highly desirable in terms of efficiency, are costly and usually limited to fixed pulse widths and repetition rates. A high degree of complication occurs when these rates are required to be variable.

Accordingly it is a primary object of this invention to provide an improved repetitive-pulse signal generator that operates to maintain a substantially constant pulse amplitude in delivering power to a load, whereby it is adapted for use in modulating magnetrons in radar systems and the like having relatively high modulation power requirements.

It is also an object of this invention to provide an improved repetitive pulse signal generator which is adapted to provide rapid switching of pulse power to an electrically resistive load in such a way that the magnitude of the power delivered can be accurately controlled or maintained at a predetermined substantially constant level.

It is a still further object of this invention to provide an improved repetitive-pulse signal generator which permits precise adjustment of pulse amplitude prior to actual loading whereby precise control may be maintained over the pulse amplitude supplied to a device under test or to other load means.

In accordance with the invention, a repetitive-pulse signal generator is provided which permits precise adjustment of pulse amplitude prior to actual exposure to load by utilizing an effectively dummy load and switching system in connection therewith. The pulse amplitude is adjusted with continuous pulsed energy fed to the dummy load that has been carefully matched electrically to the normal load provided or to the element under test. At a desired time, the pulse power is switched from the dummy load means to the device under test or to the actual load during the charge interval, that is, the pulse-off time of the pulser so that, for all purposes, the pulser or pulse circuit is unaware that a change in load has taken place. The net result is that a precise control is maintained over the pulse amplitude supplied to the normal load or to a device under test.

This is particularly valuable for the reason that quite often elements being tested are influenced irreversibly by their previous exposure to electrical stimuli, hence it is not possible to adjust power level while the element is being tested. Electro-explosive devices, bolometers, barretters and other electronic components are often in this category, particularly when data on transient response or firing probability are desired.

The invention will further be understood from the following description, when considered in connection with the accompanying drawing, and its scope is pointed out in the appended claims.

Referring to the drawing, the single figure is a schematic circuit diagram of a repetitive-pulse signal generator and control system therefor embodying the invention. In the system shown, a pulse repetition-rate generator or signal source 5 is connected through an output lead 6 and system ground 8 with a cathode-follower and phase-splitter circuit 7 as indicated. The wave-form of the signal output from the generator 5 is of the constant-amplitude pulse type in a continuous pulse train with a constant repetition rate or frequency as indicated at B.

Also applied to the cathode follower and phase splitter 7 are gating pulse signals or gate control signals from a pulse application gate circuit which may be of the type indicated at 9 and connected therewith through an output lead 10 and system ground 8. The gating pulse output is in elongated rectangular pulse indicated by the waveform A. This provides a blanking and cut-off band-pass signal and appears on two signal output leads 13 and 14 of the cathode-follower and phase splitter circuit 7. The timing or pulse-repetition rate signal B is carried through and appears on two main signal channel output circuit leads 15 and 16 from the circuit 7. These circuits are connected with on-and-off gate circuits indicated at 17 which also provide a return circuit through system ground 8.

The gated signal output from the gate circuit 17 appear as wave-forms C and D showing a clipped or gated series band of pulses at D and the remainder of the blanked or cut-off pulses at C. The gated and blanked signal pulse trains are delivered through output channel leads 20 and 21 and system ground from the gates 17 to an amplifier and cathode-follower circuit 22 and thence through output channel leads 23 and 24 and system ground to a trigger circuit and cathode follower 25. As indicated, the wave-form C is transmitted through the output lead 24 and wave-form D is transmitted through the output lead 23. These appear at the output channel leads 28 and 29 from the circuit 25 leading to the final output stage 30 having dual output circuits provided by the thyratron tubes V17 and V18. This stage supplies a dummy load comprising a load resistor 31, and pulse-wave shape and magnitude-monitoring equipment 33 connected therewith through a decoupling resistor element 32 and system ground 8 as indicated. Output terminals 35 and 36 are provided for the normal output load or test apparatus and here indicated as being connected to a detector device 34. Output coupling is through the cathode circuits of the thyratron tubes V17 and V18.

The repetition-pulse rate generator 5 may be of any suitable type such as that indicated, comprising triodes connected as multivibrators as shown in tubes V1 and V2, and the cathode-follower and phase-splitter circuit may likewise be of a standard construction comprising a cathode-follower amplifier tube V3 and a phase-splitter amplifier tube V6 with a cathode output connection from the tube V3 to the two channel output leads 15 and 16, as indicated, through suitable coupling elements or networks 37.

The on-off gates 17 include two amplifier tubes V7 and V8 of the double-control-grid type having control-grid connections with the output leads 15 and 16 for receiving the timing signal B and with the output leads 13 and 14 for receiving the blanking pulse formed by the application gate 9 comprised of V4 and V5. The amplifier and cathode-follower 22 comprise two amplifier tubes V9 and V10 connected with the output leads 20 and 21 respectively from the on-and-off gates 17. These in turn are coupled to the two cathode-follower output amplifier tubes V11 and V12 respectively and thence through the leads 23 and 24 to the trigger-circuit and cathode-follower 25.

The circuit 25 includes two trigger amplifier tubes V13 and V14 and cathode-follower output amplifier tubes V15 and V16. In the output stage 30, two thyratron tubes V17 and V18 are utilized to couple the dummy load resistor 31 and the output circuit, represented by the terminals 35 and 36, into the respective cathode circuits. Plate and cathode current is supplied through a common plate supply lead 39 connected to a source 40 in the network 38 through control resistors 41 and a voltage or current-selector switch 42. A second wafer of the selector switch 43 provides for selective switching of the pulse forming networks 44 between the plate lead 39 and ground for the system to change the time of each pulse.

In operation, the pulse repetition rate generator 5 provides the continuous train of pulses indicated by the wave-form B, at any one frequency of any three different frequency ranges in the present example, and the signals from this generator are fed through the amplifier V3 of the cathode-follower and phase-splitter amplifier circuit 7 to each of two gating amplifiers V8 and V7 only one of which is permitted to conduct at a time. Under normal operating conditions, V8 is conducting to apply the pulse train B unblanked, as at C, to the amplifiers V9–V11–V13–V15. Thus, normally the train of pulses pass continually through the dummy load circuitry from the amplifer V15 and through the output thyratron tube V17. The magnitude and shape of these pulses may be monitored on suitable pulse measuring equipment as indicated at 33 which may include a cathode ray tube or like indicator means. Assurance is made that the electrical properties of the dummy load and those of the device under test or the output load are the same under low values of excitation power. The pulse width, repetition rates and amplitude can be adjusted by conventional means. For example the pulse width can be varied by changing the pulse-forming network as by adjustment of the switch 43. Repetition rate or frequency can be changed by changing the time constants in the pulse-repetition-frequency oscillator 5 and the amplitude by changing the voltage level to the pulse-forming network 38 by the switch 42. All of these parameters are adjusted while providing excitation to the dummy load. These adjustments may be made as precisely as is necessary in a given application.

At the time the excitation of the load or the device under test is desired, the pulse application gate 9 is excited and this will cause a rectangular blanking signal or pulse A to be applied to the phase splitter V6. The output of the phase splitter will drive the normally conducting gate V8 off with the result that no pulses will pass through the dummy load circuit 31 during the blanking period. This is illustrated in the wave-form C and T2 is the time at which the gates are reversed. The time from T2 to T3 and the clipped band of pulses (D) is adjustable so that the time of application or bank width of pulses applied to the load or the device under test can be varied.

The generator as shown in the circuit diagram has been constructed and tested in the form shown and is highly satisfactory in operation. It is also seen that this device or circuit is readily adapted to use on transistor and semiconductor circuitry since it is constructed in unit form and furthermore full limitation in operational range has not been reached. It is theoretically possible to provide broad operating ranges of pulse repetition frequency, pulse width, pulse amplitude and pulse application time. Furthermore this circuit is not necessarily limited to DC pulse application but may be used with magnetrons or other generators that require precision control or power, pulse width, amplitude and frequency under certain conditions of load and excitation for modulation of other phenomena such as electromagnetic radiation.

We claim:

1. A repetitive signal pulse generator system comprising in combination, pulse-rate generator means providing a continuous train of constant amplitude output signal pulses, means coupled to said generator means for translating said pulse train into two signal conveying channels, a pair of gating amplifiers coupled one in each of said signal conveying channels for alternate off-and-on signal pulse translation therethrough, gate pulse generator means providing a periodic rectangular gating pulse output for actuating said gating amplifiers, means coupled between said last named generator means and said gating amplifiers for applying gating pulses to said amplifiers from said generator means in out-of-phase relation for alternate channel conduction normally with one channel conducting the continuous pulse train and the other channel cut off, means including an output amplifier coupled with said one channel for applying the continuous pulse train output therefrom to a dummy load electrically equal to a normal output load for said system, and means including a second output amplifier coupled with said other channel for applying the alternate signal pulse output therefrom to a normal output load in response to applied gating pulses from said gate pulse generator means, said signal pulse output being in limited pulse trains of uniform amplitude corresponding in time duration to the length of the gating pulses and to blanking intervals in the continuous pulse train output of the one channel.

2. A repetitive signal pulse generator system as defined in claim 1, wherein the output amplifier means are in a single dual stage connected with and controlled by a pulse-forming network and a variable operating voltage supply means, and wherein the pulse output is switched from the dummy load to the normal output load during each charge interval or pulse off time of the pulse rate generator means, whereby any train of output pulses are delivered to the normal output load without diminuation of the pulse amplitude.

3. A repetitive signal pulse generator system as defined in claim 1, wherein the means coupled to the pulse rate generator means for translating the pulse train output therefrom into two signal conveying channels is an amplifier of the cathode follower type for in-phase conduction therethrough, and wherein the means for applying gating pulses to said gating amplifiers from said generator means in out-of-phase relation is an amplifier of the phase-splitter type.

4. A repetitive signal pulse generator system as defined in claim 2, wherein the output amplifier means is in a single output stage of the electronic-tube type having cathode output coupling to the dummy load and the normal load, and wherein the gating amplifiers are each of the electronic-tube type with dual input grids one of which in each amplifier is coupled to the pulse rate generator means through a cathode follower amplifier and the other of which in each amplifier is coupled to the gate pulse generator means through a phase-splitter amplifier.

5. A repetitive pulse signal generator comprising in combination, pulse generator means providing a continuous train of pulse-repetition signals of preselected frequency, a second pulse generator means providing rectangular gating pulses of extended durations, a cathode-follower amplifier coupled with said first named generator means and a phase splitter amplifier coupled with said second generator means to provide two in-phase signal conveying channels for continuous pulse train output and two out-of-phase gating pulse conveying circuits, on-and-off gate circuits connected one in each of said channels and one with each of said gating pulse circuits for alternate off-and-on control thereby, a trigger and cathode-follower amplifier connected to receive the signal output of the on-and-off gate circuits in a clipped and gated band of pulse repetition signals in one channel and a blanked train of pulse-repetition signals in the other channel, an output amplifier coupling the one channel output to a normal load, and a second output amplifier coupling the other channel output to a dummy load electrically equal to said normal load.

References Cited

UNITED STATES PATENTS

| | | | |
|---|---|---|---|
| 3,148,357 | 9/1964 | Thornton | 340—174 |
| 3,176,143 | 3/1965 | Lode | 328—70 XR |
| 3,271,701 | 9/1966 | Racy | 332—42 |

ARTHUR GAUSS, *Primary Examiner.*

S. D. MILLER, *Assistant Examiner.*